US012687142B2

(12) United States Patent
Han et al.

(10) Patent No.: US 12,687,142 B2
(45) Date of Patent: Jul. 21, 2026

(54) HIGH FLOW HIGH EFFICIENCY EGR COOLER

(71) Applicant: Woodward, Inc., Fort Collins, CO (US)

(72) Inventors: Yi Han, Fort Collins, CO (US); Jessica K. DeBlois, Fort Collins, CO (US); Phillip S. Eggerling, Fort Collins, CO (US); Dave O. Richards, Fort Collins, CO (US); Adithya Baburaj, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 450 days.

(21) Appl. No.: 18/225,429

(22) Filed: Jul. 24, 2023

(65) Prior Publication Data

US 2025/0035074 A1 Jan. 30, 2025

(51) Int. Cl.
*F02M 26/29* (2016.01)
*F02M 26/28* (2016.01)
(Continued)

(52) U.S. Cl.
CPC ............ *F02M 26/29* (2016.02); *F02M 26/28* (2016.02); *F02M 26/40* (2016.02); *F28D 7/10* (2013.01);
(Continued)

(58) Field of Classification Search
CPC ........ F02M 26/29; F02M 26/28; F02M 26/22; F02M 26/40; F28F 1/022; F28F 13/06;
(Continued)

(56) References Cited

U.S. PATENT DOCUMENTS 1,329,559 A 2/1920 Tesla
6,691,823 B2 2/2004 Lee et al.
(Continued)

FOREIGN PATENT DOCUMENTS

CN 1431398 7/2003
CN 215633286 U * 1/2022
(Continued)

OTHER PUBLICATIONS

International Search Report and Written Opinion in International Application No. PCT/US2024/039176, mailed on Oct. 9, 2024, 12 pages.

(Continued)

*Primary Examiner* — Grant Moubry
(74) *Attorney, Agent, or Firm* — Taft Stettinius & Hollister LLP

(57) ABSTRACT

The subject matter of this specification can be embodied in, among other things, a heat exchanger apparatus that includes a first fluid conduit defining a first fluid flow path for a first fluid and comprising a fluid diode that is at least partly fluidically diodic and formed of a thermally conductive material, the fluid diode having a first fluid inlet, a first fluid outlet, a first sub-conduit extending from the fluid inlet to the fluid outlet, and a second sub-conduit extending from the first sub-conduit proximal the fluid inlet to the first sub-conduit proximal the fluid outlet as a partial loop defining a cavity extending through the partial loop, and a second fluid conduit in thermal communication with the first fluid conduit and defining a second fluid flow path through the partial loop, fluidically isolated from the first fluid flow path, for a second fluid.

20 Claims, 9 Drawing Sheets

(51) Int. Cl.

| | |
|---|---|
| ***F02M 26/40*** | (2016.01) |
| ***F28D 7/10*** | (2006.01) |
| ***F28D 7/16*** | (2006.01) |
| ***F28F 1/02*** | (2006.01) |
| ***F28F 13/06*** | (2006.01) |
| *F28D 21/00* | (2006.01) |

(52) U.S. Cl.
CPC ............ *F28D 7/1607* (2013.01); *F28F 1/022* (2013.01); *F28F 13/06* (2013.01); *F28D 2021/008* (2013.01); *F28F 2210/02* (2013.01)

(58) Field of Classification Search
CPC ...... F28F 2210/02; F28D 7/10; F28D 7/1607; F28D 2021/008
See application file for complete search history.

(56) References Cited

U.S. PATENT DOCUMENTS

| | | | |
|---|---|---|---|
| 9,695,654 B2 | 7/2017 | Stephenson et al. | |
| 10,245,586 B2 | 4/2019 | Gilbert et al. | |
| 11,047,249 B2 | 6/2021 | Schwendenmann | |
| 11,060,636 B2 | 7/2021 | Dalmas, II et al. | |
| 11,767,979 B2 * | 9/2023 | Liu ......................... | F02K 7/067 60/247 |
| 2015/0059718 A1 | 3/2015 | Claywell et al. | |
| 2019/0333652 A1 | 10/2019 | Loewen et al. | |

FOREIGN PATENT DOCUMENTS

| | | | |
|---|---|---|---|
| CN | 215927599 | 1/2022 | |
| CN | 216811961 | 6/2022 | |
| CN | 113108631 B | 9/2022 | |
| CN | 113482807 | 9/2022 | |
| CN | 119102937 A * | 12/2024 | ............. F02M 26/29 |
| DE | 2657586 | 6/1978 | |
| DE | 102005034773 A1 | 2/2007 | |
| JP | 2012082941 A | 4/2012 | |

OTHER PUBLICATIONS

Physicshack.com [online], “Download—3D Cad Data—Tesla Valve, Valvular Conduit,” Nov. 27, 2020, retrieved on May 29, 2024, retrieved from URL: <https://physicshack.com/product/3d-cad-data-tesla-valve/>, 3 pages.

Sketchfab.com [online], “Tesla Valve Tube Section Parametric,” physicshack, Feb. 13, 2016, retrieved on May 29, 2024, retrieved from URL <https://sketchfab.com/3d-models/tesla-valve-tube-section-parametric-840280f2533949faac6e06f2fcccc83c?sscid=b1k7_13ruk1&utm_source=shareasale&utm_medium=affiliate&utm_campaign=1538097_1272560>, 4 pages.

Thingiverse.com [online], “Cylindrical Tesla Valve Design 1,” Integza, Nov. 18, 2020, retrieved on May 29, 2024, retrieved from URL: <https://www.thingiverse.com/thing:4657853>, 8 pages.

Thingiverse.com [online], “Tesla Valve Rounded,” Kempy, Nov. 25, 2017, retrieved on May 29, 2024, retrieved from URL: <https://www.thingiverse.com/thing:2668591>, 8 pages.

* cited by examiner

HIGH FLOW HIGH EFFICIENCY EGR COOLER

TECHNICAL FIELD

This instant specification relates to exhaust gas recirculation (EGR) intercoolers, more particularly EGR intercoolers providing a fluidic diode function.

BACKGROUND

Internal combustion engine thermal efficiency is partially limited by an ability, or lack thereof, to increase exhaust gas recirculation (EGR) flow at peak torque condition without creating other system drawbacks. This is due to low pressure differences between the exhaust manifold and intake manifold. Because of this limitation, previous internal combustion engines (ICE) cannot be operated at higher brake thermal efficiencies (BTE).

SUMMARY

In general, this document discusses exhaust gas recirculation (EGR) intercoolers that provide a fluidic diode function.

In a first example implementation, a heat exchanger apparatus includes a first fluid conduit defining a first fluid flow path for a first fluid and comprising a fluid diode that is at least partly fluidically diodic and formed of a thermally conductive material, the fluid diode having a first fluid inlet, a first fluid outlet, a first sub-conduit extending from the fluid inlet to the fluid outlet, and a second sub-conduit extending from the first sub-conduit proximal the fluid inlet to the first sub-conduit proximal the fluid outlet as a partial loop defining a cavity extending through the partial loop, and a second fluid conduit in thermal communication with the first fluid conduit and defining a second fluid flow path through the partial loop, fluidically isolated from the first fluid flow path, for a second fluid.

Various implementations can include some, all, or none of the following features. The fluid diode can partly define the second fluid conduit and the cavity can partly define the second fluid flow path. The second fluid conduit can be formed of another thermally conductive material and can extends through the cavity. The fluid diode can be a Tesla valve. The first sub-conduit can define the first fluid flow path as a substantially linear fluid flow path from the fluid inlet to the fluid outlet. The second sub-conduit can define the second fluid flow path as a substantially curved fluid flow path having a predetermined radius. The fluid inlet can include a third sub-conduit defining a first substantially linear fluid flow path, the first sub-conduit can define the first fluid flow path as a second substantially linear fluid flow path arranged at a first predetermined angle to the first substantially linear fluid flow path, the second sub-conduit can include a curved section in fluid communication with the first sub-conduit, extending away from the first sub-conduit at a second predetermined angle to the first sub-conduit and a linear section configured to fluidically connect the third sub-conduit and the curved section, the linear section defining a third substantially linear fluid flow path arranged substantially aligned with the first substantially linear fluid flow path. The linear section can have a predetermined length L, and the curved section can have a minimum radius of about $$L \tan\frac{\alpha}{2},$$

wherein $\alpha$ is the first predetermined angle. The first predetermined angle is in a range of about 10 degrees to about 80 degrees. The heat exchanger apparatus can include a first inlet manifold in fluidic communication with the first fluid inlet and configured to supply a first fluid to the first fluid conduit, a second inlet manifold in fluidic communication with a second inlet of the second fluid conduit and configured to supply a second fluid to the second fluid conduit, a first outlet manifold in fluidic communication with the first fluid outlet, and a second outlet manifold in fluidic communication with a second fluid outlet of the second fluid conduit.

In another example implementation, a heat exchanger apparatus includes a first fluid conduit defining a first fluid flow path and configured as a Tesla valve having at least one partial loop defining an annulus, and a second fluid conduit in thermal communication with the first fluid conduit and defining a second fluid flow path, different from the first fluid flow path, through the annulus.

Various implementations can include some, all, or none of the following features. The Tesla valve can have a plurality of the partial loops, fluidically interconnected and defining the first fluid flow path. The heat exchanger can include a first inlet manifold configured to supply a first fluid to the first fluid conduit, where the first fluid conduit can include another Tesla valve arranged fluidically parallel to the Tesla valve, a first outlet manifold configured to receive the first fluid from the first fluid conduit, a second inlet manifold configured to supply a second fluid to the second fluid conduit, where the second fluid conduit can include a plurality of the second fluid flow paths through one or more of the plurality of partial loops, and a second outlet manifold configured to receive the second fluid from the second fluid conduit. The first fluid can be combustion exhaust gases, and the second fluid can be a coolant fluid configured to absorb heat energy transferred away from the combustion exhaust gases.

In another example implementation, a method of heat exchange includes flowing a first fluid in a first direction through a first fluid conduit configured as a Tesla valve defining a first fluid flow path and comprising at least one partial loop defining an annulus, and flowing a second fluid, different from the first fluid, through a second fluid flow path, different from the first fluid flow path, at least partly defined by the annulus.

Various implementations can include some, all, or none of the following features. The method can include receiving combustion exhaust gases from an exhaust manifold of a combustion engine, providing the combustion exhaust gases as the first fluid, cooling the combustion exhaust gases by transferring thermal energy from the combustion exhaust gases to the second fluid, and providing the cooled combustion exhaust gases to an intake manifold of the combustion engine. Flowing the first fluid in the first direction through the first fluid conduit configured as the Tesla valve defining the first fluid flow path and having at least one partial loop defining the annulus can include flowing the first fluid along a first substantially straight portion of the first fluid flow path past an intersection with the partial loop, redirecting, by the first fluid conduit, the first fluid at a predetermined angle of about 10 degrees to about 80 degrees, and flowing the first fluid along a second substantially straight portion of the first fluid flow path. The method can include flowing the first fluid through the first fluid flow path in a second direction opposite the first fluid flow direction, and resisting, by the fluid flow path, fluid flow in the second direction. Flowing the first fluid through the first fluid flow path in the second direction opposite the first fluid flow direction can include flowing a first portion of the first fluid flow along a substantially straight portion of the first fluid flow path, flowing a second portion of the first fluid flow along a curved portion of the first fluid flow path toward an intersection of the curved portion and the substantially straight portion, and rejoining the a first portion of the first fluid flow and the second portion of the first fluid flow proximal the intersection, and resisting, by the fluid flow path, fluid flow in the second direction comprises fluidically interfering, by the second fluid flow and based on the rejoining, the first fluid flow. The substantially straight portion can have a predetermined length L, and the curved portion has a minimum radius of about $$L\tan\frac{\alpha}{2},$$

where α is a predetermined angle of the intersection.

The systems and techniques described here may provide one or more of the following advantages. First, a system can reduce engine fuel usage. Second, the system can reduce engine emissions. Third, the system can reduce exhaust back pressure. Fourth, the system can provide improved spark timing. Fifth, the system can reduce the cost of exhaust after-treatment. Sixth, the system can improve measurement of exhaust gas recirculation. Seventh, the system can smooth transient operation. Eighth, the system can improve accuracy of torque and/or speed control.

The details of one or more implementations are set forth in the accompanying drawings and the description below. Other features and advantages will be apparent from the description and drawings, and from the claims.

DETAILED DESCRIPTION

This document describes systems and techniques for cooling exhaust gas recirculation (EGR) gases that increase EGR efficiency by preventing EGR backflow. In general, an EGR cooler is configured as a check valve or fluidic diode that permits gas flow in the forward direction (e.g., from exhaust, through an EGR cooler and toward an engine inlet such as an intake manifold) while resisting gas flow in the reverse direction (e.g., from intake, through an EGR cooler, and toward an exhaust manifold). Reliability and service life of the EGR cooler is increased through the use of a fluidic diode design that does not require the use of moving mechanical parts.

Figure 1:
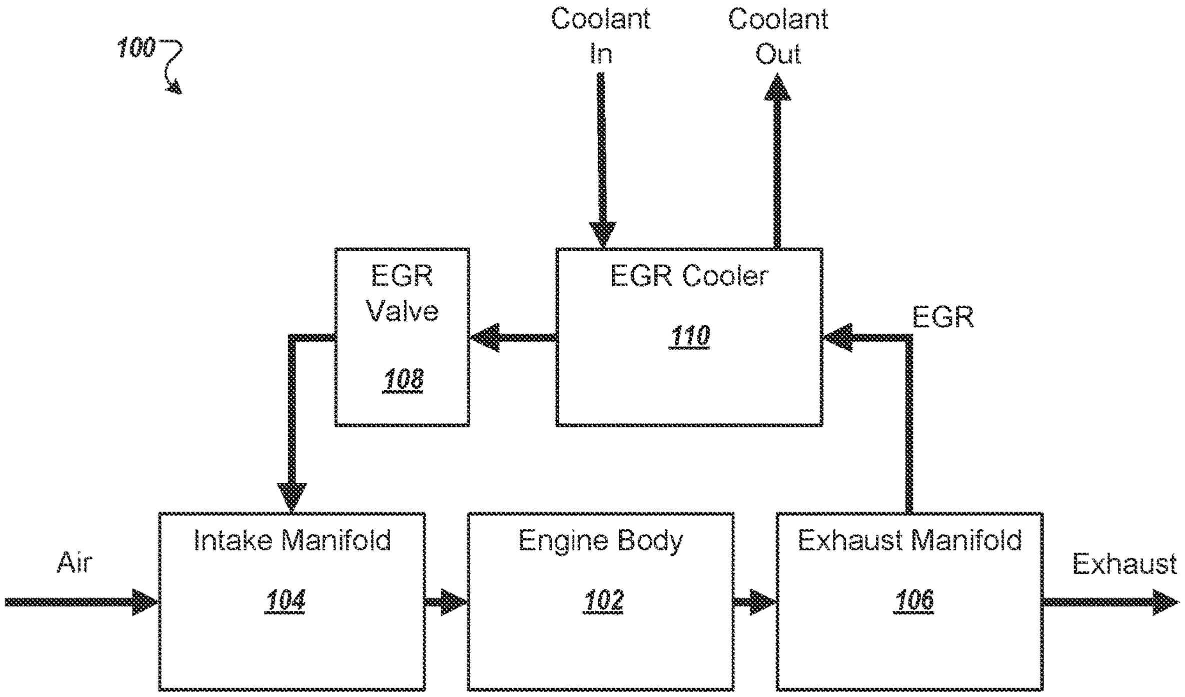
FIG. 1 is a schematic diagram of an example engine system.

FIG. 1 is a schematic diagram of an example engine system 100. The example engine system 100 shown in FIG. 1 can be a diesel engine with an exhaust gas recirculation (EGR) subsystem, or the example engine system 100 can be another type of engine (e.g., compression ignition, spark ignition). The EGR subsystem can, in some instances, reduce the formation of unwanted emissions (e.g., nitrogen oxides, NOx) in the engine system 100. The techniques described here can be applied in the example engine system 100, or in other types of systems having a gas stream with unsteady flow.

The example engine system 100 includes an engine body 102, an intake manifold 104, an exhaust manifold 106, an exhaust gas recirculation (EGR) valve 108, and an EGR cooler 110. The engine system 100 can include additional or different components and subsystems. The components of the engine system 100 can be configured as in the example shown in FIG. 1, or the components can be configured in another manner.

The intake manifold 104 of the example system 100 receives air from an air intake system. In some example engine systems, the air intake system can include, for example, a turbocharger compressor, an intake air cooler, an air intake throttling valve and other components. The intake manifold 104 can also receive exhaust gas from the exhaust manifold 106. The EGR valve 108 can control the flow of exhaust gas into the intake manifold 104.

The EGR cooler 110 can cool the flow of combustion exhaust gases into the intake manifold 104. In some instances, there is no inflow of exhaust gas at the intake manifold 104. The intake manifold 104 can provide an air mixture to the engine body 102. The air mixture provided to the engine body 102 can include air from the air intake system, which may be mixed with cooled combustion exhaust gases from the exhaust manifold 106 and possibly other fluids. The intake manifold 104 can include various flow meters, valves, sensors, and other components that are not specifically shown in FIG. 1.

The engine body 102 can include various features, components, and subsystems. For example, the engine body 102 can include a combustion chamber, a cylinder, a piston, an ignition system, a fuel injection system, and various other features. The engine body 102 can receive the air mixture (e.g., through an intake valve) from the intake manifold 104 and fuel from a fuel injection system. An ignition system can ignite the air-fuel mixture in the combustion chamber in the engine body 102, which moves the piston and produces the mechanical output of the engine body 102 (e.g., rotation of a crank shaft, etc.). The exhaust gas created by combustion of the air-fuel mixture in the engine body 102 can be directed (e.g., through an exhaust valve) to the exhaust manifold 106.

The exhaust manifold 106 receives exhaust gas from the engine body 102. The exhaust manifold 106 can communicate the exhaust gas to a component of the exhaust system or another subsystem of the engine system 100. In some implementations, the exhaust manifold 106 directs the exhaust gas through a turbocharger exhaust turbine. From the turbocharger, in such implementations, the exhaust gas can be communicated from the engine system 100, for example, to an external environment. The exhaust manifold 106 can communicate exhaust gas through the EGR cooler 110 and the EGR valve 108. The exhaust manifold 106 can include various flow meters, valves, sensors, and other components that are not specifically shown in FIG. 1.

The EGR valve 108 controls the flow of exhaust gas from the exhaust manifold 106 to the intake manifold 104. For example, the EGR valve 108 can control flow by manipulating (e.g., opening, closing, constricting, dilating, etc.) an exhaust flow path. In the example shown in FIG. 1, the EGR valve 108 is downstream of the EGR manifold branch point. The EGR valve 108 can raise the upstream pressure so that exhaust gas flows back to the intake manifold 104 at a sufficient rate. There may be, and typically are, more valves in an EGR system. Although these are not specifically shown in the example engine system 100, there may also be a valve for metering the flow into the intake manifold 104 as well as an intake throttle valve to further improve the pressure difference from the exhaust manifold 106 to the intake manifold 104 in some instances.

The EGR cooler 110 is configured as a heat exchanger apparatus that cools the flow of exhaust gas from the exhaust manifold 106 to the intake manifold 104. For example, the EGR cooler 110 can cool flow by transferring heat from exhaust gases in an exhaust flow path to a coolant in a coolant flow path. In the example shown in FIG. 1, the EGR cooler 110 is downstream of the EGR manifold branch point. The EGR cooler 110 can raise the upstream pressure so that exhaust gas flows back to the intake manifold 104 at a sufficient rate.

Although not specifically shown in the example engine system 100, in some embodiments there may also be a valve for metering the flow into the intake manifold 104 as well as an intake throttle valve to further improve the pressure difference from the exhaust manifold 106 to the intake manifold 104.

In some implementations, exhaust gas pressure generated by the engine system 100 applies a force to the EGR valve 108. For example, the EGR valve 108 can include a throttle valve assembly in fluid communication with the exhaust ports of the engine body 102 and the inlet of a turbocharger exhaust turbine. The throttle valve can experience severe fluid force fluctuations, for example, due to unsteady engine exhaust processes in the exhaust manifold 106. In these and other contexts, exhaust gas can impart an unsteady aerodynamic torque loading on the EGR valve shaft, which can displace the EGR valve from the desired valve position. In some cases, the unsteady loading on the EGR valve can cause the valve to hit its end-of-travel stop repeatedly, which may cause mechanical instability or failure of the EGR valve.

In some embodiments, a controller can control operation of the EGR valve 108. In some examples, the controller can generate an EGR valve control signal configured to achieve a desired EGR valve position. The controller can generate the EGR valve control signal based on data stored in memory, data received from the EGR valve 108, engine operating condition data from sensors installed in the engine system 100, or a combination of these and other data. The controller can send the EGR valve control signal to the EGR valve 108 to control the position of the EGR valve 108.

In previous designs where an EGR valve is arranged downstream from a previously known EGR cooler, the previously known EGR cooler can significantly damp out useful (e.g., forward-flowing) pulsations. To reduce or eliminate valve position disturbance created by unsteady exhaust gas pressure on the EGR valve 108 while permitting useful pulsations and preventing backflow, the EGR cooler 110 acts as a check valve. For example, the EGR cooler 110 can permit pulses to flow forward (e.g., away from exhaust and toward intake) substantially unimpeded, and can substantially block or resist reverse flow.

The sensors in the engine system 100 can include, for example, pressure sensors, temperature sensors, accelerometers, position sensors, etc. In some implementations, one or more pressure sensors in the intake manifold 104 provide data that indicate the engine load; one or more engine revolution sensors in the engine body 102 provide data that indicate the engine speed (e.g., based on the revolution speed of a crank shaft, etc.); and one or more position sensors in the engine body 102 provide data that indicate engine position (e.g., based on the position of a piston, etc.). In some implementations, one or more position sensors in the EGR valve 108 provide data that indicate the position of the EGR valve shaft or the EGR valve actuator, etc.

Figure 2:
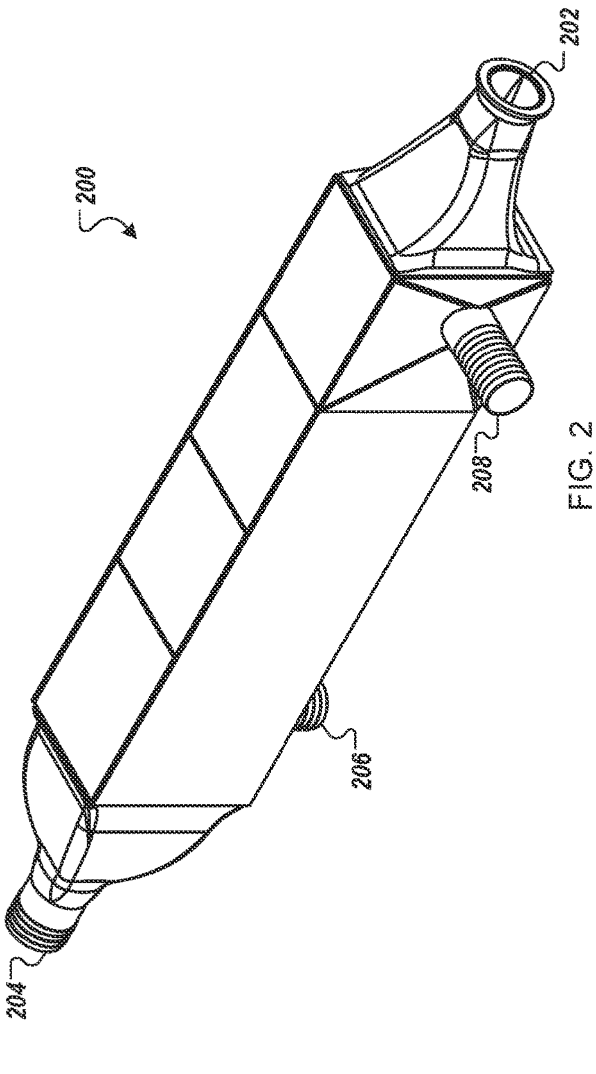
FIG. 2 is a perspective view of an example exhaust gas recirculation cooler.

FIG. 2 is a perspective view of an example exhaust gas recirculation (EGR) cooler 200. In the illustrated example, the EGR cooler 200 is configured as a heat exchanger apparatus. In some embodiments, the EGR cooler 200 can be the example EGR cooler 110 of FIG. 1. The EGR cooler 200 includes an EGR port 202 (e.g., a fluid inlet configured to supply a first fluid to the EGR cooler 200) that is in fluidic communication with an EGR port 204 (e.g., a fluid outlet). The EGR cooler 200 has an internal configuration, described in more detail below, that provides a check valve or fluidic diode function for EGR gases that flow primarily from the EGR port 202 toward the EGR port 204.

The EGR cooler 200 includes a coolant port 206 (e.g., a coolant fluid inlet configured to supply another, different fluid to the EGR cooler 200) that is in fluidic communication with a coolant port 208 (e.g., a coolant fluid outlet). The EGR cooler 200 has an internal configuration, which will be described in more detail below, that functions as a heat exchanger in which heat energy of EGR gases is transferred to a coolant fluid flow between the coolant port 206 and the coolant port 208 (or a coolant flow between the coolant port 208 and the coolant port 206).

Figure 4:
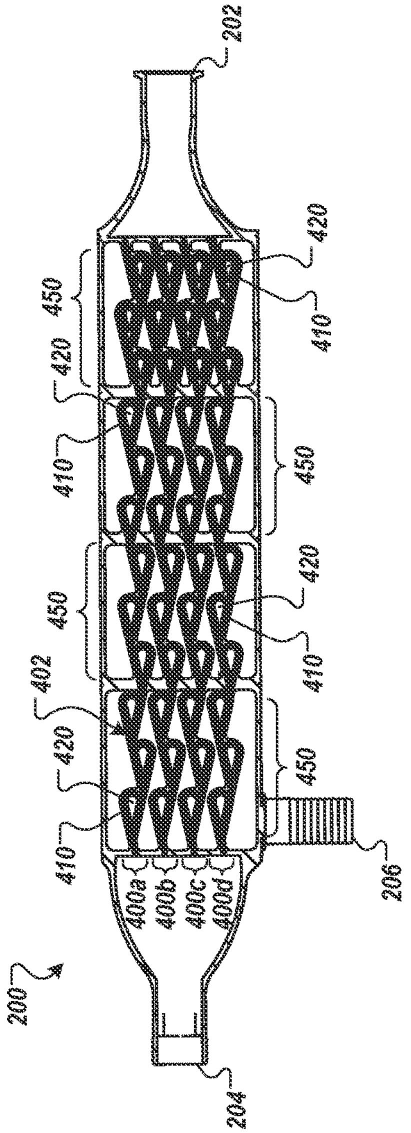
FIG. 4 is a sectional side view of the example exhaust gas recirculation cooler of FIGS. 2-3.
Figure 3:
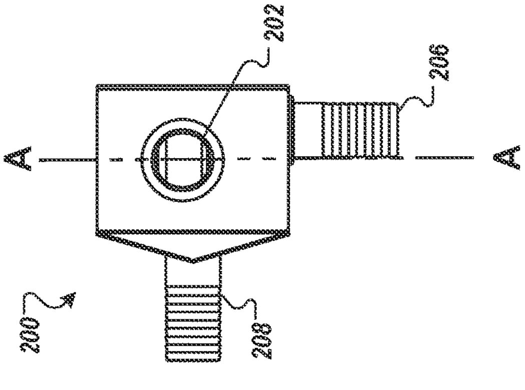
FIG. 3 is an end view of the example exhaust gas recirculation cooler of FIG. 2.

FIG. 3 is an end view of the example EGR cooler 200 of FIG. 2. FIG. 4 in a sectional side view of the example EGR cooler 200 of FIGS. 2-3, taken along section A-A of FIG. 3. The EGR cooler 200 includes a fluid diode 400*a* (e.g., check valve), a fluid diode 400*b*, a fluid diode 400*c*, and a fluid diode 400*d*. Although the example EGR cooler 200 includes four such fluid diodes, in some examples, more or fewer fluid diodes (e.g., one, two, three, five, ten, twenty) can be used. For example, the EGR cooler 200 can be manufactured (e.g., by additive manufacturing, 3D printing) in four sections, each having six stages of paired fluid diodes. In other examples, other designs and/or manufacturing techniques can be implemented. Although the fluid diodes 400*a*-400*d* are shown as being substantially identical in the illustrated example, in some examples, the fluid diodes can be configured with different and/or varying geometries, and/or different packaging configurations.

In general, each of the fluid diodes 400*a*-400*d* defines a first fluid conduit 402 comprising a thermally conductive material configured as a Tesla valve having a number of at least partial loops 410 having an annulus 420 (e.g., eye). As will be described in more detail below, in such a configuration, fluid can flow in one fluid flow direction (e.g., from the EGR port 202 to the EGR port 204) substantially unimpeded, while fluid flow in the opposite fluid flow direction (e.g., from the EGR port 204 toward the EGR port 202) will subdivide the flow into two or more sub-conduits and redirect the flow against itself, resisting and/or substantially blocking reverse flow. The fluid diodes 400*a*-400*d* are configured to provide such diodic or check valve function substantially without the use of moving or mechanical parts. In some embodiments, other types of check valves and/or fluid diodes can be used (e.g., ball check valves, tilting disk valves, swing check valves).

Figure 5:
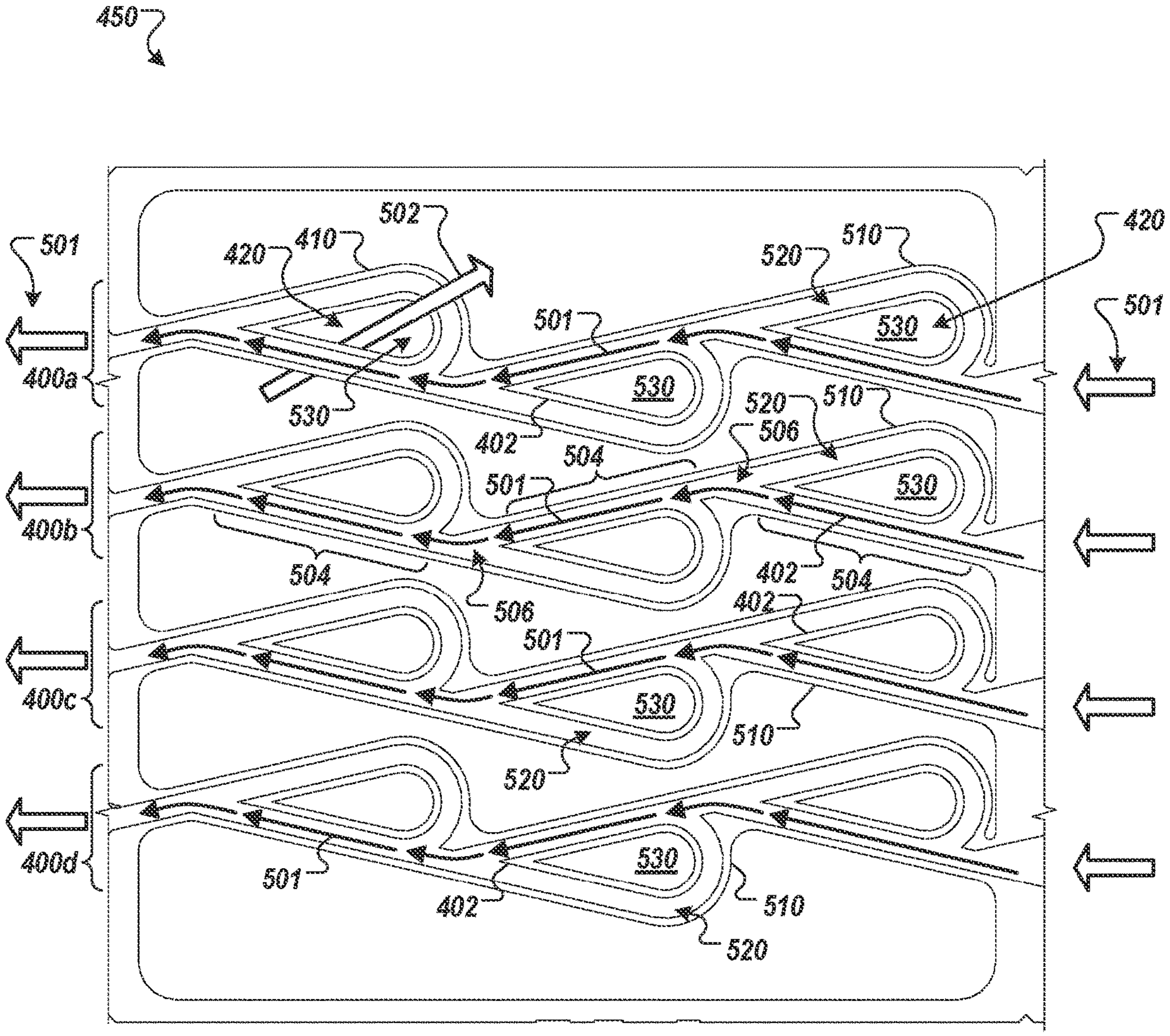
FIGS. 5 and 6 are enlarged sectional side views of a portion of the example exhaust gas recirculation cooler of FIGS. 2-4.
Figure 6:
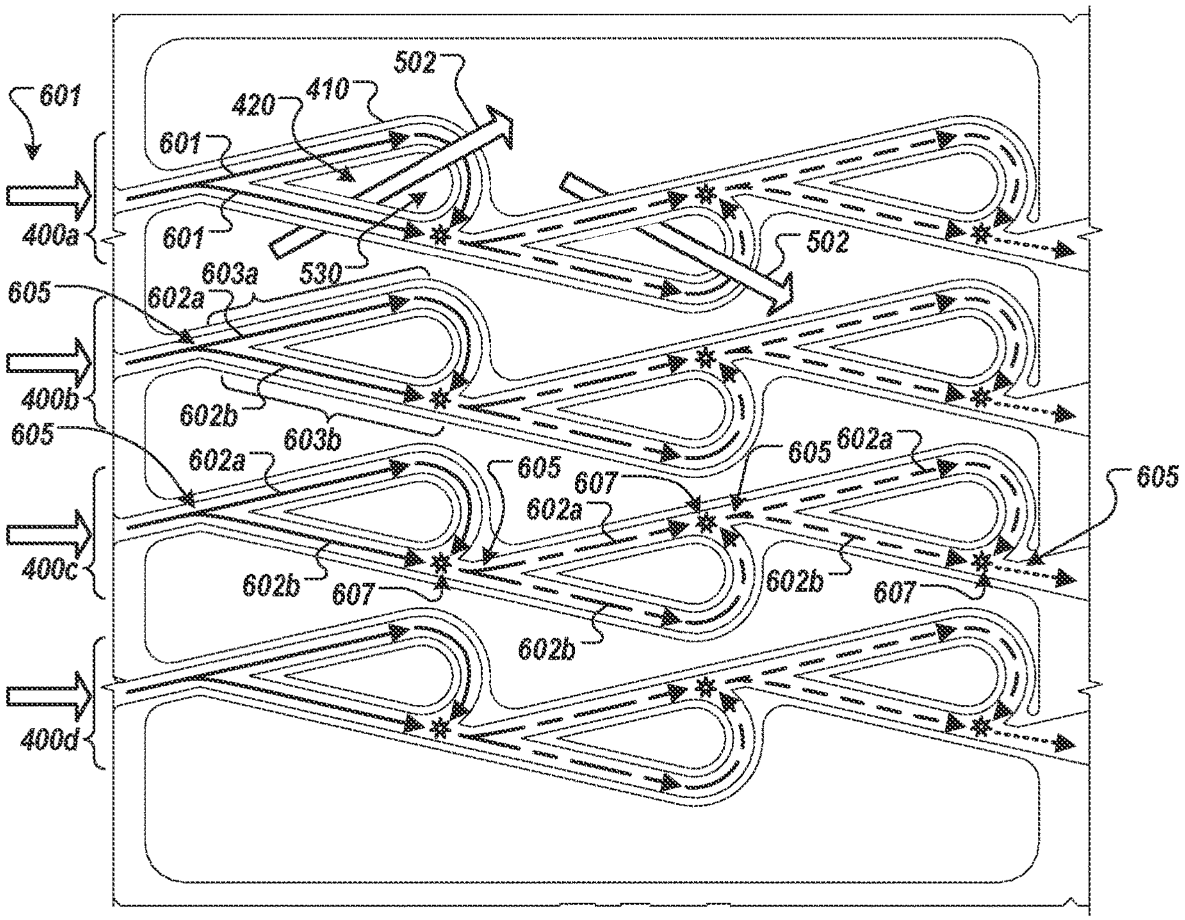

The EGR cooler 200 includes a number of intercooler cells 450. FIGS. 5 and 6 are enlarged sectional side views of an example intercooler cell 450. In the illustrated example of FIG. 5, an EGR fluid flow in a first (e.g., forward) direction is indicated by arrows 501. Each of the loops 410 is configured as portion of the first fluid conduit 402 that defines a curved fluid flow path. The first fluid conduit 402 includes a first sub-conduit 603*b* and a second sub-conduit 603*a* wherein the second sub-conduit 603*a* extends to each of the loops 410. Each of the first fluid conduits 402 has a conduit wall 510 made of a thermally conductive material that defines a fluid passage 520 formed as a curved section that defines a corresponding one of the annuli 420 to define a collection of fluid flow paths (as represented by arrow 502). Each of the annuli 420 defines another or a second fluid conduit 530 that is fluidically isolated from the first fluid conduits 402 defined by the fluid diodes 400*a*-400*d*. The fluid flow 501 flows along a series of substantially straight, linear flow paths 504 linked by a collection of low-angle joints 506. The second fluid conduits 530 are in thermal communication with the first fluid conduits 402 such that heat energy from EGR gases (or any other appropriate fluid) can be transferred through the conduit wall 510 to coolant fluid flowing through the annuli 420 (as represented by arrow 502) as the coolant flows from one coolant port 206 to the other coolant port 208.

In the illustrated example of FIG. 6, an EGR fluid flow in a second direction (e.g., based on whether the pressure dynamic between the two ends of the EGR cooler 200 is rising or descending), opposite the first direction of FIG. 5, (e.g., reverse or backward flow) is indicated by arrows 601. In the illustrated configuration, the fluid flow 601 repeatedly gets split into a subflow 602*a* through the second sub-conduit 603*a* and a subflow 602*b* though the first sub-conduit 603*b* at a collection of branches 605. The subflow 602*a* is redirected through one of the fluid passages 520 and rejoins the subflow 602*b* at a collection of joints 607. The joints 607 are configured such that the subflow 602*a* flows at least partly in opposition to the subflow 602*b*. The flow resistance created at each of the joints 607 creates additional resistance to the fluid flow 601, providing a diodic function to the fluid flows 501 and 601.

Figure 7:
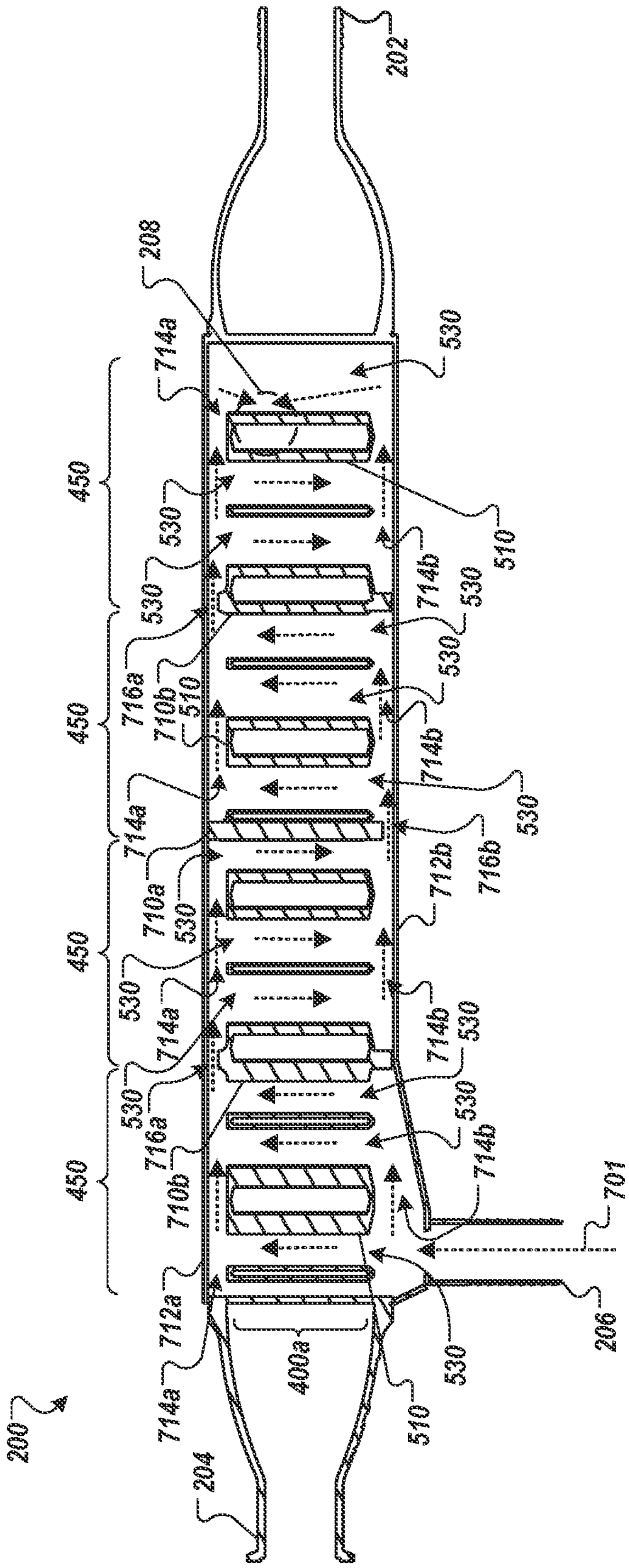
FIG. 7 is a sectional top view of the example exhaust gas recirculation cooler of FIGS. 2-6.

FIG. 7 is a sectional top view of the example EGR cooler 200 of FIGS. 2-6. Visible in this view are the EGR port 202, the EGR port 204, the coolant port 206, and the coolant port 208. The EGR cooler 200 includes a longitudinal wall 712*a* and a longitudinal wall 712*b* that partly define lateral portions of a housing of the EGR cooler 200. Also visible is a sectional view of the fluid diode 400*a*, including the fluid conduits 530. In the illustrated example, the fluid conduits 530 extend only partly between the longitudinal wall 712*a* and a longitudinal wall 712*b*, and partly define a longitudinal fluid channel 714*a* and a longitudinal fluid channel 714*a* between the fluid conduits 530, the longitudinal wall 712*a*, and a longitudinal wall 712*b*.

The EGR cooler 200 includes a collection of lateral interior diverter walls 710*a* and a collection of lateral interior diverter walls 710*b*. The lateral interior diverter walls 710*a* that extend from the longitudinal wall 712*a* part way to the longitudinal wall 712*b*, defining passages 716*a* between the longitudinal wall 712*a* and the lateral interior diverter wall 710*a*. The lateral interior diverter walls 710*b* that extend from the longitudinal wall 712*b* part way to the longitudinal wall 712*a*, defining passages 716*b* between the longitudinal wall 712*b* and the lateral interior diverter wall 710*b*.

In the illustrated example, a coolant fluid flow 701 generally flows from the coolant port 206 to the coolant port 208. Coolant flows in through the coolant port 206 to the passage 714*b*, then through the fluid conduits 530 to the longitudinal fluid channel 714*a*, as partly redirected by the lateral interior diverter wall 710*a*. As the coolant flows through the fluid conduits 530, thermal energy is absorbed from EGR gases (or other fluid) flowing through the fluid diodes 410*a*-410*d* through the conduit walls 510.

Coolant fluid flow along the longitudinal fluid channel 714*a* flows around the lateral interior diverter wall 710*b* through the passage 716*a* to the next intercooler cell 450. Coolant flows to the longitudinal fluid channel 714*a*, then through the fluid conduits 530 to the passage 714*b*, as partly redirected by the lateral interior diverter wall 710*b*. As the coolant flows through the fluid conduits 530, additional thermal energy is absorbed from EGR gases (or other fluid) flowing through the fluid diodes 410*a*-410*d* through the conduit walls 510.

Coolant continues to flow back-and-forth through the serpentine labyrinth formed by the fluid conduits 530 to the coolant port 208, where the heated coolant exits the EGR cooler 200. In some embodiments, the heated coolant can be cooled actively and/or passively. For example, the coolant can be passed through another heat exchanger (e.g., a radiator, geothermal reservoir) to dissipate thermal energy to the ambient environment. In another example, the coolant can be processed through a refrigeration cycle configured to remove heat energy from the coolant.

The design of the EGR cooler 200 as illustrated is one example of various designs that can be implemented. The size, shape, flow directions, flow paths, flow patterns, and/or other structural details of the EGR 200 can be configured based on various target implementations (e.g., the design can be made application-specific).

Figure 8:
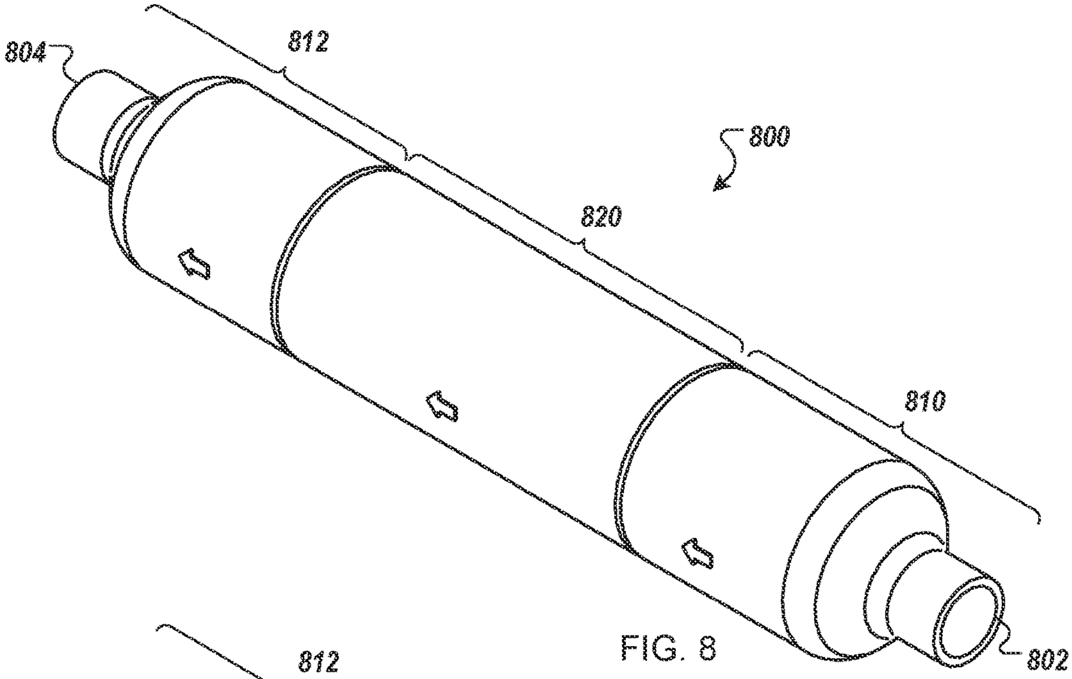
FIG. 8 is a perspective view of another example exhaust gas recirculation cooler.
Figure 9:
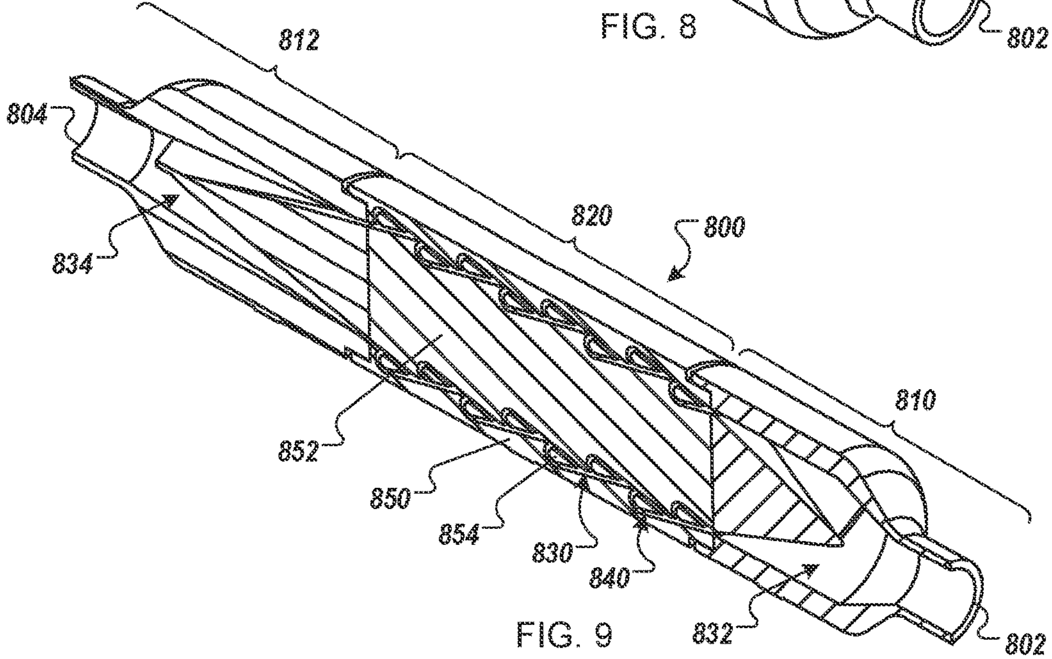
FIG. 9 is a sectional perspective view of the example exhaust gas recirculation cooler of FIG. 8.
Figure 10:
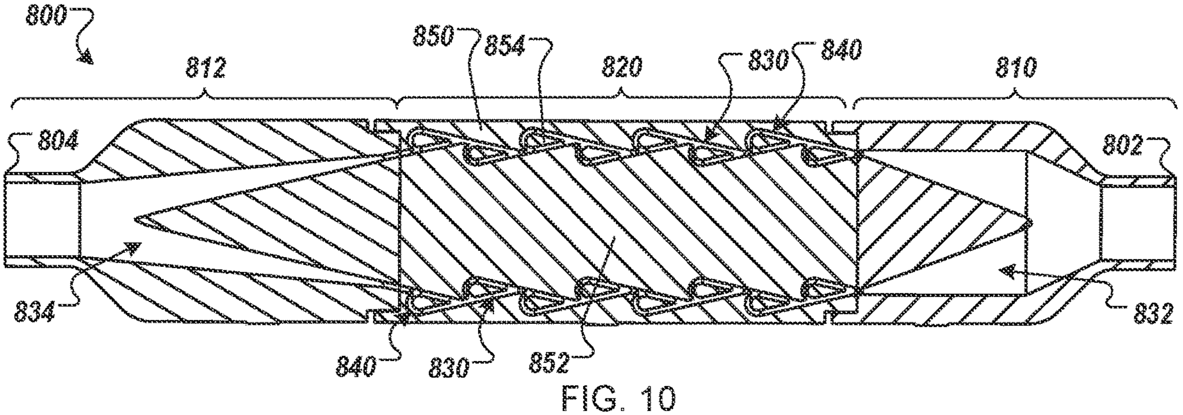
FIG. 10 is a sectional side view of the example exhaust gas recirculation cooler of FIGS. 8-9.

FIG. 8 is a perspective view of an example fluid diode 800. FIG. 9 is a sectional perspective view of the example fluid diode 800 of FIG. 8. FIG. 10 is a sectional side view of the example fluid diode 800 of FIGS. 8-9. In some embodiments, the fluid diode 800 can be all or part of the example EGR cooler 110 of FIG. 1. For example, the fluid diode 800 can be enclosed in a cooling fluid jacket or immersed in a coolant fluid, and/or coolant conduits can be defined within the fluid diode 800.

The fluid diode 800 includes an inlet port 802 configured to receive a fluid (e.g., EGR gases) that is fluidically connected to an outlet port 804. The fluid diode 800 includes three major sections, including an inlet manifold 810 that includes the inlet port 802, an outlet manifold 812 that includes the outlet port 804, and a fluid diode portion 820 configured to fluidically connect the inlet manifold 810 to the outlet manifold 812 and define a fluid path there between.

Figure 11:
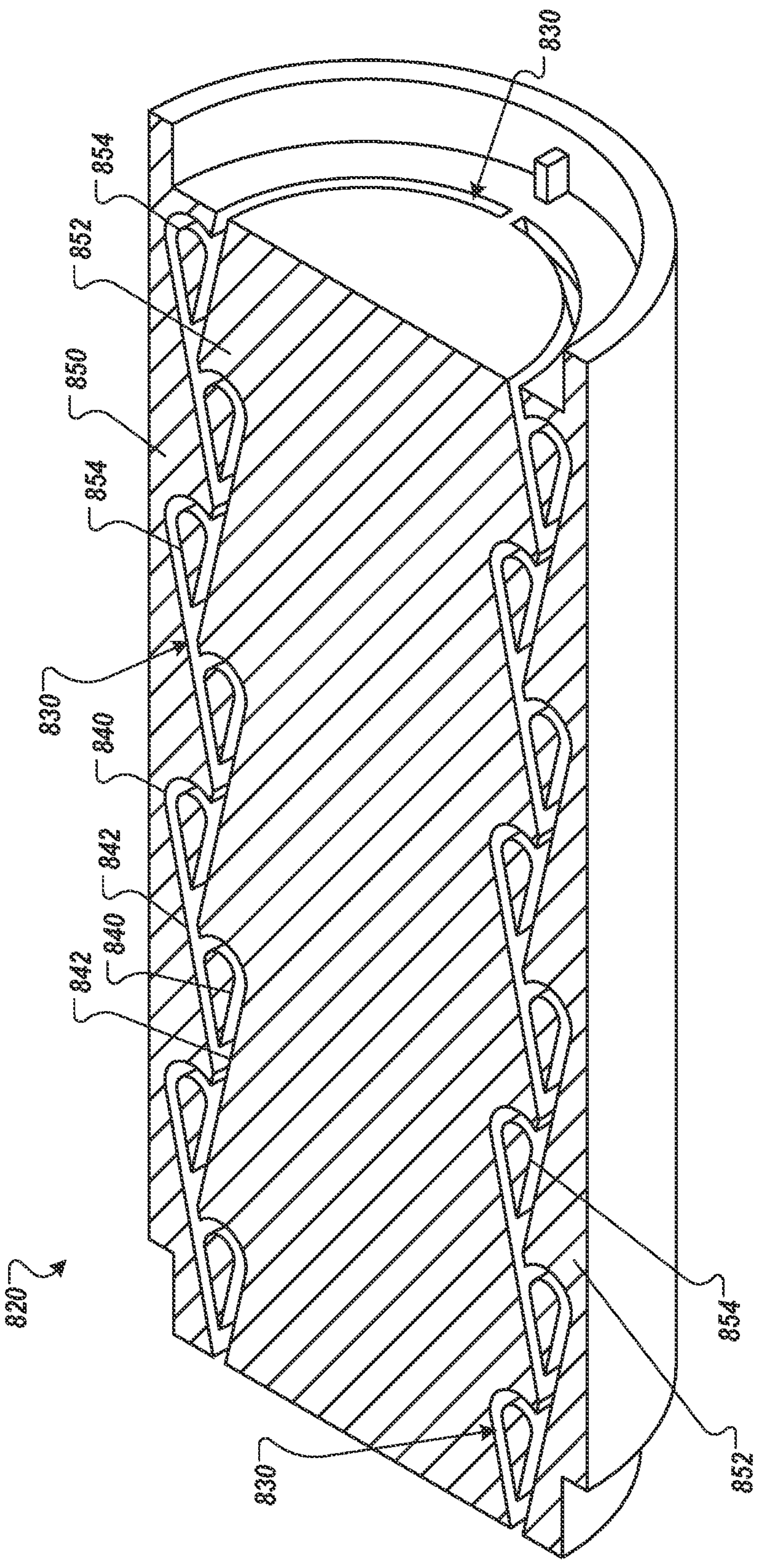
FIG. 11 is an enlarged sectional perspective view of a fluid diode portion of the example exhaust gas recirculation cooler of FIGS. 8-10.

FIG. 11 is an enlarged sectional perspective view of the example fluid diode portion 820 of the example fluid diode 800 of FIG. 8. Referring primarily to FIG. 11, the fluid diode portion 820 defines a fluid conduit 830. The fluid conduit 830 fluidically connects to a fluid conduit 832 defined by the inlet manifold 810, and fluidically connected to a fluid conduit 834 defined by the outlet manifold 812.

In general, the fluid diode portion 820 defines the fluid conduit 830 as a Tesla valve having a number of loops 840 and linear sections 842. Previously known Tesla valve designs are substantially rectangular in cross-section, in which the fluid conduits are formed as rectangular tubular conduit that bends and turns longitudinally while being substantially straight laterally. Unlike such previous designs, the fluid diode portion 820 is substantially revolute, in which the fluid conduit 830 is formed as a substantially cylindrical cavity defined between a cylindrical outer housing 850, and a cylindrical inner housing 852. The loops 840 are further defined by rings 854 that are arranged between the cylindrical outer housing 850 and a cylindrical inner housing 852.

The revolute, three-dimensional, cylindrical configuration of the fluid conduit 830 is capable of providing performance characteristics that differ from linear and/or rectangular Tesla valve type fluid diodes. For example, in rectangular configurations, the flowable cross-sectional areas of loops are substantially equal to the flowable cross-sectional areas of linear portions. By contrast the flowable cross-sectional areas of the loops 840 and the linear sections 842 is proportional to their predetermined radius/radii. For example, the radially outermost parts of the loops 840 have a relatively larger radius and therefore a relatively larger flowable area than their relatively smaller radiused linear sections 842.

During reverse flow, the flowable area available to the fluid increases as it flows into the outermost portions of the loops 840. As the area increases, the fluid velocity drops. As the fluid flows around the loops 840, the flow is redirected radially inward, forcing the fluid into a relatively smaller area that creates additional resistive, diodic backpressure not generally found in rectangular designs.

In such a configuration, fluid can flow in one direction (e.g., from the inlet port 802 to the outlet port 804) substantially unimpeded, while fluid flow in the opposite direction (e.g., from the outlet port 804 toward the inlet port 802) will subdivide the flow and redirect the flow against itself, resisting and/or substantially blocking reverse flow. The fluid diode portion 820 is configured to provide such diodic or check valve function substantially without the use of moving or mechanical parts.

Figure 12:
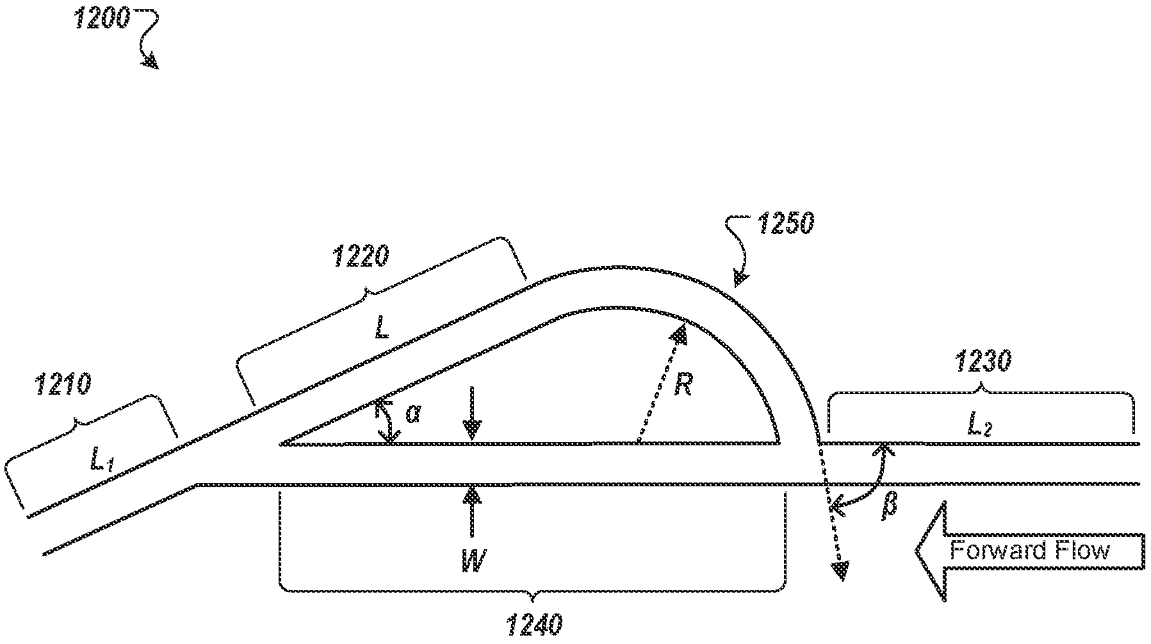
FIG. 12 is a diagram of an example fluid diode configuration.

FIG. 12 is a diagram of an example fluid diode configuration 1200. In general, diodic valves (e.g., such as the example EGR cooler 110 of FIG. 1, the example EGR cooler 200 of FIGS. 2-7, and/or the example fluid diode 800 of FIGS. 8-11) are structures that have a higher pressure drop for fluid flow in a reverse direction than in a forward direction. This difference in flow resistance causes a net directional flow rate in the forward direction in oscillating flows. The efficiency of such flows is often expressed in diodicity $D_i$, being the ratio of directional resistance.

In some implementations, diodicity can be given as:

$$D_i = \frac{R_r}{R_f}$$

If $D_i > 1$, then the conduit in question has diodic behavior, where:

$$R = \frac{\Delta P}{Q}$$

Where ΔP is the applied pressure difference between two ends of the conduit, and Q is the flow rate. $D_i$ is found to be inversely proportional to R.

The performance and behavior of a Tesla valve type fluid conduit can be modified by varying various dimensional parameters of its design (e.g., to configure the design to meet one or more predetermined performance parameters). In the illustrated example, the fluid diode configuration 1200 includes a linear (e.g., straight) portion 1210 having a predetermined length $L_1$ and defining a linear fluid flow path, a linear portion 1220 having a length L and defining a linear fluid flow path, a linear portion 1230 having a predetermined length $L_2$ and defining a linear fluid flow path a linear portion 1240 having a predetermined width W and defining a linear fluid flow path, and a curved portion 1250 having a predetermined radius R. The linear portion 1240 branches away from the linear portion 1220 at a predetermined angle α, and the curved portion 1250 intersects the linear portion 1240 at a predetermined tangent angle β.

The relationships between various ones of the dimensions of the fluid diode configuration 1200 can affect the diodicity of fluid diode configuration 1200. The angle α can be selected to be between about 10 degrees to about 80 degrees. Larger angles of β can reduce the amount of flow entering the curved portion 1250 in the direction of forward flow. Larger angles of β can increase the resistive or blocking action of reverse flow through the curved portion 1250.

Figure 13:
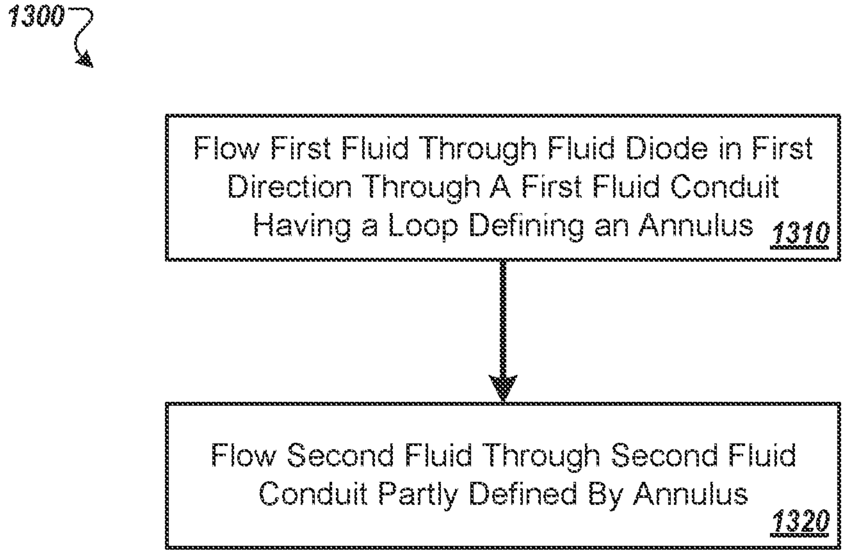
FIG. 13 is flow chart that shows an example of a process for cooling recirculated exhaust gases.

FIG. 13 is flow chart that shows an example of a process 1300 for cooling recirculated exhaust gases. In some implementations, the process 1300 can be performed by all or part of the example engine system 100 of FIG. 1, the example EGR cooler 110 of FIG. 1, the example EGR cooler 200 of FIGS. 2-7, the example fluid diode 800 of FIGS. 8-11, and/or the example fluid diode configuration 1200 of FIG. 12.

At 1310, a first fluid is flowed in a first direction through a first fluid conduit configured as a Tesla valve defining a first fluid flow path and comprising at least one partial loop defining an annulus. For example, an EGR gas can be supplied to the fluid port 202 to flow through the fluid conduits 402 to the fluid port 204.

At 1320, a second fluid, different from the first fluid, is flowed through a second fluid flow path, different from the first fluid flow path, at least partly defined by the annulus. For example, coolant can be provided to the fluid port 206 to flow through the annuli 420 to the fluid port 208.

In some implementations, the process 1300 can include receiving combustion exhaust gases from an exhaust manifold of a combustion engine, providing the combustion exhaust gases as the first fluid, cooling the combustion exhaust gases by transferring thermal energy from the combustion exhaust gases to the second fluid, and providing the cooled combustion exhaust gases to an intake manifold of the combustion engine. For example, heat energy from hot EGR gases can be transferred through the walls of the fluid conduits 402 to coolant flowing through the annuli 420.

In some implementations, the process 1300 can include flowing the first fluid along a first substantially straight portion of the first fluid flow path past an intersection with the partial loop, redirecting, by the first fluid conduit, the first fluid at a predetermined angle of about 10 degrees to about 80 degrees, and flowing the first fluid along a second substantially straight portion of the first fluid flow path. For example, EGR gases can flow in a forward direction as discussed in the description of FIG. 5.

In some implementations, the process 1300 can include flowing the first fluid through the first fluid flow path in a second direction opposite the first fluid flow direction, and resisting, by the fluid flow path, fluid flow in the second direction. In some implementations, flowing the first fluid through the first fluid flow path in the second direction opposite the first fluid flow direction can include flowing a first portion of the first fluid flow along a substantially straight portion of the first fluid flow path, flowing a second portion of the first fluid flow along a curved portion of the first fluid flow path toward an intersection of the curved portion and the substantially straight portion, and rejoining the a first portion of the first fluid flow and the second portion of the first fluid flow proximal the intersection, and resisting, by the fluid flow path, fluid flow in the second direction comprises fluidically interfering, by the second fluid flow and based on the rejoining, the first fluid flow. For example, EGR gases flowing in a reverse direction can be resisted or blocked as discussed in the description of FIG. 6.

In some implementations, the substantially straight portion can have a predetermined length L, and the curved portion can have a minimum radius of about $$L \tan\frac{\alpha}{2},$$

wherein α can be a predetermined angle of the intersection. For example, the fluid diode 200 can be configured as discussed in the description of the example fluid diode configuration 1200 of FIG. 12.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A heat exchanger apparatus comprising:

a housing having a plurality of longitudinal walls;

a plurality of lateral interior diverter walls positioned in the housing to extend away from at least one of the plurality of longitudinal walls to define a plurality of passages between the lateral interior diverter walls and the longitudinal walls, wherein the plurality of passages are configured to receive a second fluid;

a first fluid conduit positioned within the housing, the first fluid conduit defining a first fluid flow path for a first fluid and comprising a fluid diode that is at least partly fluidically diodic and formed of a thermally conductive material, the fluid diode comprising:

a first fluid inlet;

a first fluid outlet;

a first sub-conduit extending from the fluid inlet to the fluid outlet; and a second sub-conduit extending from the first sub-conduit proximal the fluid inlet to the first sub-conduit proximal the fluid outlet as a partial loop defining a cavity extending through the partial loop;

a second fluid conduit positioned within the housing and fluidly connected with the plurality of passages, the second fluid conduit also positioned within the cavity defined by the partial loop, the second fluid conduit being fluidically isolated from the first fluid conduit, the second fluid conduit defining a second fluid flow path for the second fluid that is separate from the first fluid flow path, wherein the second fluid conduit is in thermal communication with the first fluid conduit.

2. The heat exchanger apparatus of claim 1, wherein the fluid diode partly defines the second fluid conduit and the cavity partly defines the second fluid flow path.

3. The heat exchanger apparatus of claim 1, wherein the second fluid conduit is formed of another thermally conductive material and extends through the cavity.

4. The heat exchanger apparatus of claim 1, wherein the fluid diode comprises a Tesla valve.

5. The heat exchanger apparatus of claim 1, wherein the first sub-conduit defines the first fluid flow path as a substantially linear fluid flow path from the fluid inlet to the fluid outlet.

6. The heat exchanger apparatus of claim 1, wherein the second sub-conduit defines the second fluid flow path as a substantially curved fluid flow path having a predetermined radius.

7. The heat exchanger apparatus of claim 1, wherein:

the fluid inlet comprises a third sub-conduit defining a first substantially linear fluid flow path wherein the fluid flow path is in a reverse flow direction;

the first sub-conduit defines the first fluid flow path as a second substantially linear fluid flow path arranged at a first predetermined angle to the first substantially linear fluid flow path;

the second sub-conduit comprises:

wherein the partial loop includes a curved section in fluid communication with the first sub-conduit, extending away from the first sub-conduit at a second predetermined angle to the first sub-conduit; and a linear section configured to fluidically connect the third sub-conduit and the curved section, the linear section defining a third substantially linear fluid flow path arranged substantially aligned with the first substantially linear fluid flow path.

8. The heat exchanger apparatus of claim 7, wherein:

the linear section has a predetermined length L; and the curved section has a minimum radius of about $$L \tan\frac{\alpha}{2},$$

wherein α is the first predetermined angle.

9. The heat exchanger apparatus of claim 7, wherein the first predetermined angle is in a range of about 10 degrees to about 80 degrees.

10. The heat exchanger apparatus of claim 1, further comprising:

a first inlet manifold in fluidic communication with the first fluid inlet and configured to supply a first fluid to the first fluid conduit;

a second inlet manifold in fluidic communication with a second inlet of the second fluid conduit and configured to supply a second fluid to the second fluid conduit;

a first outlet manifold in fluidic communication with the first fluid outlet; and a second outlet manifold in fluidic communication with a second fluid outlet of the second fluid conduit.

11. A heat exchanger apparatus comprising:

a housing having a plurality of longitudinal walls;

a plurality of lateral interior diverter walls positioned in the housing to extend away from at least one of the plurality of longitudinal walls to define a plurality of passages between the lateral interior diverter walls and the longitudinal walls, wherein the plurality of passages are configured to receive a second fluid;

a first fluid conduit positioned within the housing, the first fluid conduit defining a first fluid flow path for a first fluid and configured as a Tesla valve comprising at least one partial loop defining an annulus; and a second fluid conduit positioned within the housing and fluidly connected with the plurality of passages, the second fluid conduit in thermal communication with the first fluid conduit and defining a second fluid flow path for the second fluid, different from the first fluid flow path, through the annulus.

12. The heat exchanger of claim 11, wherein the Tesla valve comprises a plurality of the partial loops, fluidically interconnected and defining the first fluid flow path.

13. The heat exchanger of claim 11, further comprising:

a first inlet manifold configured to supply a first fluid to the first fluid conduit, wherein the first fluid conduit comprises another Tesla valve arranged fluidically parallel to the Tesla valve;

a first outlet manifold configured to receive the first fluid from the first fluid conduit;

a second inlet manifold configured to supply a second fluid to the second fluid conduit, wherein the second fluid conduit comprises a plurality of the second fluid flow paths through one or more of the plurality of partial loops; and a second outlet manifold configured to receive the second fluid from the second fluid conduit.

14. The heat exchanger of claim 11, wherein the first fluid comprises combustion exhaust gases, and the second fluid comprises a coolant fluid configured to absorb heat energy transferred away from the combustion exhaust gases.

15. A method of heat exchange comprising:

providing a housing having a plurality of longitudinal walls, and a plurality of lateral interior diverter walls positioned in the housing to extend away from at least one of the plurality of longitudinal walls to define a plurality of passages between the lateral interior diverter walls and the longitudinal walls, wherein the plurality of passages are configured to receive a second fluid;

flowing a first fluid in a first direction through a first fluid conduit configured as a Tesla valve positioned within the housing, the first fluid conduit defining a first fluid flow path and comprising at least one partial loop defining a cavity extending through the partial loop;

flowing a second fluid through a second fluid conduit positioned within the housing and fluidly connected with the plurality of passages, the second fluid conduit positioned within the cavity defined by the partial loop, the second fluid conduit defining a second fluid flow path for the second fluid that is separate from the first fluid flow path, wherein the second fluid conduit is in thermal communication with the first fluid conduit.

16. The method of claim 15, further comprising:

receiving combustion exhaust gases from an exhaust manifold of a combustion engine;

providing the combustion exhaust gases as the first fluid;

cooling the combustion exhaust gases by transferring thermal energy from the combustion exhaust gases to the second fluid; and providing the cooled combustion exhaust gases to an intake manifold of the combustion engine.

17. The method of claim 15, wherein flowing the first fluid in the first direction through the first fluid conduit configured as the Tesla valve defining the first fluid flow path and comprising at least one partial loop defining the cavity comprises:

flowing the first fluid along a first substantially straight portion of the first fluid flow path past an intersection with the partial loop;

redirecting, by the first fluid conduit, the first fluid at a predetermined angle of about 10 degrees to about 80 degrees; and flowing the first fluid along a second substantially straight portion of the first fluid flow path.

18. The method of claim 15, further comprising:

flowing the first fluid through the first fluid flow path in a second direction opposite the first fluid flow direction; and resisting, by the fluid flow path, fluid flow in the second direction.

19. The method of claim 18, wherein:

flowing the first fluid through the first fluid flow path in the second direction opposite the first fluid flow direction comprises:

flowing a first portion of the first fluid flow along a substantially straight portion of the first fluid flow path;

flowing a second portion of the first fluid flow along a curved portion of the first fluid flow path toward an intersection of the curved portion and the substantially straight portion; and rejoining the first portion of the first fluid flow and the second portion of the first fluid flow proximal the intersection; and resisting, by the fluid flow path, fluid flow in the second direction comprises fluidically interfering, by the second fluid flow and based on the rejoining, the first fluid flow.

20. The method of claim 19, wherein:

the substantially straight portion has a predetermined length L; and the curved portion has a minimum radius of about $$L \tan\frac{\alpha}{2},$$

wherein $\alpha$ is a predetermined angle of the intersection.

* * * * *